United States Patent [19]

Katayama et al.

[11] Patent Number: 5,045,753
[45] Date of Patent: Sep. 3, 1991

[54] MATRIX DISPLAY APPARATUS WITH REPAIR WIRES

[75] Inventors: Mikio Katayama, Ikoma; Hiroaki Kato, Nara; Kiyoshi Nakazawa, Fujiidera; Hidenori Negoto, Ikoma; Yuzuru Kanemori, Tenri; Motokazu Inui, Kawachinagano; Akihiko Imaya; Takayoshi Nagayasu, both of Nara, all of Japan

[73] Assignee: Sharp Kabushiki Kaisha, Osaka, Japan

[21] Appl. No.: 500,131

[22] Filed: Mar. 28, 1990

[30] Foreign Application Priority Data

Mar. 28, 1989 [JP] Japan .................................. 1-77825

[51] Int. Cl.$^5$ ............................................... H01J 1/54
[52] U.S. Cl. .................................. 313/494; 313/505; 313/583; 340/784; 350/336
[58] Field of Search ............... 313/494, 584, 583, 585, 313/586, 587, 505; 340/784; 445/2; 350/336

[56] References Cited

U.S. PATENT DOCUMENTS

| 4,304,450 | 12/1981 | Bilsback | 313/583 |
| 4,752,118 | 6/1988 | Johnson | 350/336 |
| 4,807,973 | 2/1989 | Kawasaki | 340/784 |
| 4,840,459 | 6/1989 | Strong | 340/784 |

FOREIGN PATENT DOCUMENTS 62-150230  7/1987  Japan .
63-221325  9/1988  Japan .

Primary Examiner—Plamer C. Demeo
Assistant Examiner—Nimeshkumar D. Patel
Attorney, Agent, or Firm—Irell & Manella

[57] ABSTRACT

A matrix display apparatus with a layered structure in which driving wires are layered on repair wires to sandwich an insulating film therebetween, whereby it is possible to carry out complete driving of the display apparatus so that the location of picture element defects can be identified.

2 Claims, 7 Drawing Sheets

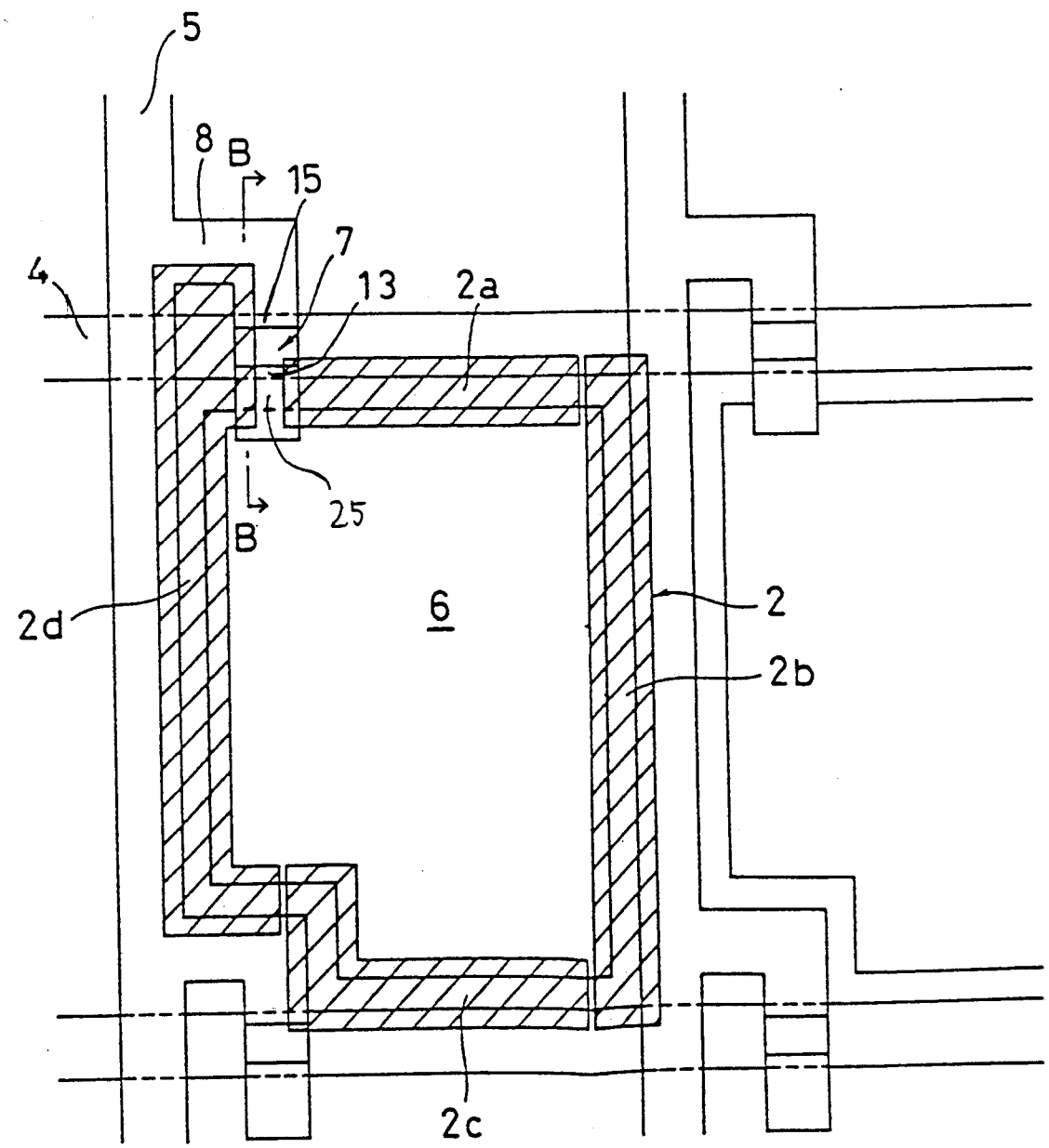

MATRIX DISPLAY APPARATUS WITH REPAIR WIRES

BACKGROUND OF THE INVENTION

1. Field of the Invention

This invention relates to a matrix display apparatus that has a dielectric substance between its substrates. More particularly, it relates to a matrix display apparatus that is used for a liquid crystal display apparatus, an electric luminescence (EL) display apparatus, a plasma display apparatus, etc.

2. Description of the Prior Art·

In matrix display apparatuses, such as in a liquid crystal display apparatus, EL display apparatus, or plasma display apparatus, voltage is applied between the electrodes for the display, and the optical characteristics of the display medium that is positioned between the electrodes for the display are modulated, so that a display pattern is formed. The method for the driving of the electrodes for the display can be the simple matrix method, the active matrix driving method, or other well-known methods.

One example of a display apparatus that makes use of the simple matrix method is shown in cross-section in FIG. 6. On glass substrate 31, scanning wires 33 with a thickness of 2000 Å made of Mo, scanning transparent electrodes 32 with a thickness of 1000 Å, an insulating film 34 with a thickness of 2000 Å made of $SiO_2$, and an orientation film 35 are formed in that order. The scanning transparent electrodes 32 act as the display electrodes, and the scanning wires 33 act as driving wires that drive the scanning transparent electrodes 32.

On glass substrate 37, which faces the substrate 31 with a liquid crystal layer 36 therebetween, there are signal wires 39 with a thickness of 2000 Å made of Mo, transparent signal electrodes 38 with a thickness of 1000 Å, and an orientation film 40. The transparent signal electrodes 38 act as the electrodes for the display, and the signal wires 39 act as the driving wires for the driving of the transparent signal electrodes 38 for signaling. FIG. 7 is a planar view of this display apparatus seen from the side of substrate 37. As shown in FIG. 7, one part of each of the scanning transparent electrodes 32 and the entire surface of the corresponding scanning wire 33 are layered together, so that they are electrically connected. In the same way, one part of each of the transparent signal electrodes 38 and the entire surface of the corresponding signal wire 39 are layered together, so that they are electrically connected. The portion of the scanning transparent electrode 32 that is not layered together with the scanning wire 33 and the portion of the transparent signal electrode 38 that is not layered together with the signal wire 39 overlap each other, so that the region of overlap constitutes a picture element of the display.

FIG. 8A is one example of an active matrix substrate that can be used in an active matrix display apparatus. FIG. 8B is a cross-sectional diagram of the display apparatus that uses the active matrix substrate of FIG. 8A, cut along the line b—b in FIG. 8A. On glass substrate 1, there is formed a base coat film 3 over its entire surface, and on the base coat film 3, gate bus wires 4 that act as scanning wires are disposed so as to form a latticework with source bus wires 5 that act as signal wires. In the space between the gate bus wires 4 and the source bus wires 5, there is sandwiched a base insulating film 11 (see below). A portion of each of the gate bus wires 4 acts as a gate electrode 9. There are picture element electrodes 6 made of a transparent conductive film (made of indium tin oxide) in the respective rectangles surrounded by the gate bus wires 4 and source bus wires 5, the picture element electrodes 6 forming a matrix. The picture element electrodes 6 act as the display electrodes. Near the edge of the picture element electrode 6, there is a switching element formed from a thin-film transistor (TFT) 7. A drain electrode 13 of TFT 7 and the picture element electrode 6 are connected electrically by drain wire 25, which acts as a drive wire for the picture element electrode. The TFT 7 is placed on the gate bus wire 4. Source electrode 15 and source bus wire 5 of the TFT 7 are connected to each other by branch wire 8.

The sectional structure near TFT 7 will be described with reference to FIG. 8B. On the top of the gate electrode 9 that forms one part of the gate bus wire 4, there is a gate insulating film 10 obtained by the anodic oxidation of the surface of said gate electrode 9. On the top of this film, there are layered base insulating film 11, which also acts as a gate insulating film, an intrinsic semiconductor layer 12 made of amorphous silicon (a-Si), a semiconductor-layer protective film 16 that protects the upper surface of the intrinsic semiconductor layer 12, and n-type semiconductor layers 14. On the n-type semiconductor layers 14, there is formed a source electrode 15, which is connected with branch wire 8, and a drain electrode 13, which is connected with picture element electrode 6. The n-type semiconductor layers 14 provide ohmic contact between the source electrode 15 and the drain electrode 13. The protective film 17 covers almost all of the upper surfaces of TFT 7 and the picture element electrode 6, and on the upper surface of the protective film 17, there is an orientation film 19.

On the inner surface of glass substrate 20 that faces glass substrate 1, a color filter layer 21, an opposing electrode 22, and an orientation film 23 are disposed, in that order. Between the glass substrates 1 and 20 there is a liquid crystal layer 18, which acts as a display medium. To improve the reproducibility of colors when a color display is made, a light-proof film (not shown) can be provided on the active matrix substrate or on the opposing substrate, so that the light-proof film is layered on part of the outer portion of the picture element electrodes 6.

In the matrix display apparatus shown in FIG. 6, there can occur a defective connection in the driving wires 33 (39) connected to the display electrodes 32 (38). Also, with the active-matrix display apparatus shown in FIG. 8, there can develop a defective connection in the driving wires that are formed from the scanning wires 4 connected to TFT 7, the signal wires 5, and the picture element electrode driving wires 25 in the space between the picture element electrode 6 and the TFT 7. In addition, there may be a failure of contact between the picture element electrode driving wires 25 and the picture element electrodes 6. If such a failure takes place, a defect in the wiring or in a picture element occurs. Such defect causes decreased productivity, which is a problem in manufacturing.

In recent years, a means to overcome defects in matrix display apparatuses has been disclosed. A means by which laser light is used to treat defects such as a connection defect or a failure of contact, melting the metal of the electrode in this area, and thereby repairing the defect, has been disclosed in Japanese Laid-Open Patent Publication No. 61-56382. However, it is impossible at times to use this means to repair the defect if the metal to be melted is too thick, or in certain kinds of failure of connection.

Defects in wiring or in picture elements can be readily identified by the operation of the display apparatus, in a simple and accurate process. The defects can be identified by eye with the use of a lens, etc. However, to identify the location of a defect in the substrate before the display apparatus has been completed involves an inspection process that is complicated and requires a highly accurate means of measurement. The technique mentioned above in which laser light is used to repair defects is generally done before the completion of the display apparatus. When this method of irradiation with laser light is used after the display apparatus is completed to repair the picture element electrodes with a switching element, the insulation between the picture element electrode and the display medium may be damaged by the heat that is generated. With damaged insulating properties, it is impossible for the potential of the picture element electrode to be maintained even with the use of the switching element. The outcome is that the defect in the picture element is not actually repaired, and the defect is therefore still present even after repair. For these reasons, defects must be repaired by this technique before the completion of the display apparatus.

SUMMARY OF THE INVENTION

The matrix display apparatus of this invention, which overcomes the above-discussed and numerous other disadvantages and deficiencies of the prior art, comprises a pair of substrates, at least one of which is translucent, a display medium that is placed between said pair of substrates and that modulates its optical characteristics in response to voltage that is applied, display electrodes that are formed on the inner surface of at least one of said pair of substrates, driving wires for the driving of said display electrodes, and repair wires for the repair of said driving wires, wherein said matrix display apparatus has a layered structure in which said driving wires are layered on said repair wires to sandwich an insulating film therebetween.

Alternatively, the active matrix display apparatus of this invention comprises a pair of substrates, at least one of which is translucent, a display medium that is placed between said pair of substrates and that modulates its optical characteristics in response to voltage that is applied, picture element electrodes arranged in matrix form on the inner surface of one of said pair of substrates; switching elements for driving the picture element electrodes, and driving wires that have scanning wires and signal wires connected to the switch elements, as well as picture element electrode driving wires that connect the switching elements and the picture element electrodes, wherein an electrically conductive light-proof film is layered on the outer portions of the picture element electrodes and on the driving wires to sandwich an insulating film therebetween, and divided into plural parts, and an area of the conductive light-proof film that is on the outer portions of the picture element electrodes and on the driving wires is coated with a protective film.

With the display apparatus of this invention, it is possible to carry out complete driving of the display apparatus so that the picture defects can be located. With the display apparatus of this invention, there is provided a layered structure with driving wires for driving of the display electrodes and repair wires for the repair of said driving wires layered on each other with an insulating film therebetween. With this structure, even if a connection defect occurs in the driving wires, it is possible to correct this defect in the completed display apparatus. This repair process can be done by the use of laser light from the outside of the display apparatus in the areas where the driving wires and the repair wires overlap each other in the regions that are positioned on both sides of the defect. By the use of the laser irradiation, the insulating layer between the driving wire and the repair wire is broken down, and an electrical connection is made between these wires. There is some distance between the display medium and layers that contain the driving wires, the insulating film, and the repair wires, because of the presence of a protective film, so there is no danger that metal melted by the use of laser light will become mixed with the display medium, even if repair done with the use of laser light is undertaken after the assembly of the display apparatus.

With the display apparatus of this invention, an electrically conductive film that is light-proof, which acts as the repair wire, is layered on the outside portions of the picture element electrodes and driving wires so as to sandwich the insulating film therebetween. The electrically conductive light-proof film is divided into a number of separate portions. With such a structure, it is easy to repair connection defects of the driving wires or contact defects between the picture element driving wire and the corresponding picture element electrode. Laser light is used to irradiate the areas on both sides of the defect where the electrically conductive light-proof film is disposed on the driving wire or the picture element electrode, thereby repairing of the defect. Because the insulating film at the area of the irradiation with laser light is broken down, the electrically conductive light-proof film comes to be electrically connected with the driving wiring or the picture element electrode. With the display apparatus of this invention, there is a protective film to cover the area where the electrically conductive light-proof film is layered on the driving wires and picture element electrodes, so even when repairs by means of irradiation with laser light are undertaken after the completion of the display apparatus, there is no danger that the heat generated will damage the insulation that exists between the picture element electrodes and the display medium.

Thus, the invention described herein makes possible the objective of providing a matrix display apparatus in which picture element defects can be repaired by the identification of the location of the picture element defect by use of the display apparatus itself whenever a picture element defect arising from a disconnection failure occurs in the driving wires and whenever a contact failure occurs between the picture element electrode driving wiring and the switching element.

BRIEF DESCRIPTION OF THE DRAWINGS

This invention may be better understood and its numerous objects and advantages will become apparent to those skilled in the art by reference to the accompanying drawings as follows:

FIG. 3A is a plan view of the active matrix substrate used in another matrix display apparatus of this invention.

DESCRIPTION OF THE PREFERRED EMBODIMENTS

EXAMPLE 1

Figure 1:
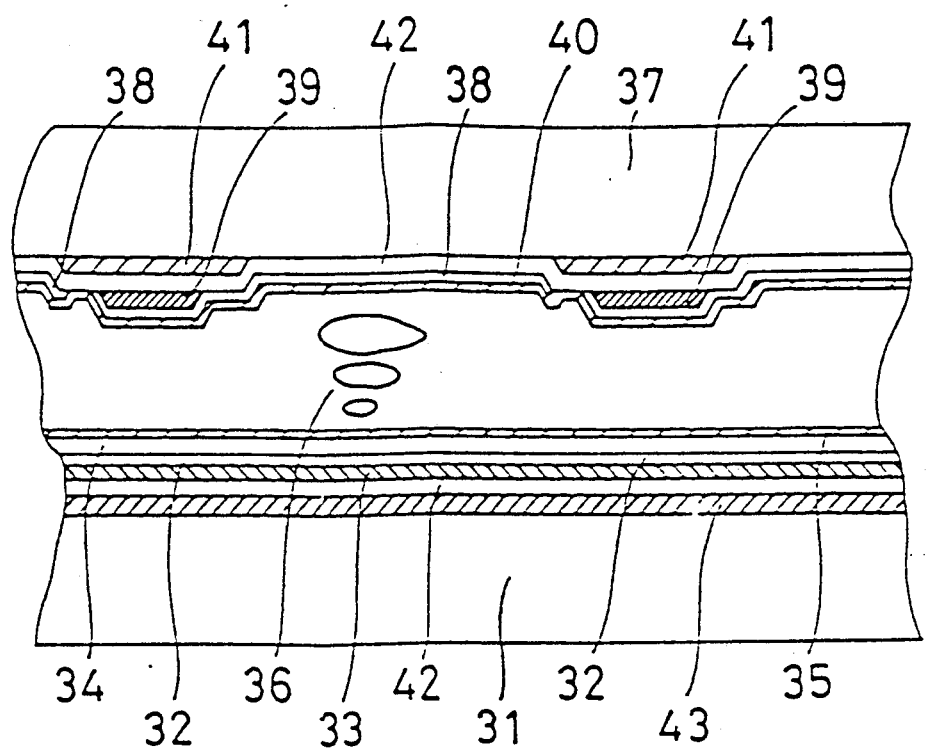
FIG. 1 is a sectional view of a simple matrix display apparatus of this invention.

FIG. 1 shows a matrix display apparatus of this invention. This example is of a simple matrix display apparatus. On glass substrate 31, there is a repair wire 43 made of Mo 2000 Å thick. Over the entire surface of this repair wire 43, there is an insulating film 42 made of $SiO_2$ 3000 Å thick. On the insulating film 42, there is scanning wire 33 made of Mo metal 2000 Å thick placed on the repair wiring 43 that is on the insulating film 42. On this scanning wire 33 there is layered a scanning transparent electrode 32 1000 Å thick, which is electrically connected with the scanning wire 33. The scanning transparent electrode 32 acts as the display electrode, and the scanning wire 33 acts as the driving wire that drives scanning transparent electrode 32. On the top of this structure, there are formed an insulating film 34 2000 Å thick made of $SiO_2$ and an orientation film 35, in this order.

Facing this substrate 31 there is a similar structure with, on a glass substrate 37, a repair wire 41 2000 Å thick made of Mo, and, over the entire surface of the repair wire 41, an insulating film 42 3000 Å thick made of $SiO_2$. Formed on top of the repair wire 41, which is on top of the insulating film 42, there are a signal wire 39 2000 Å thick made of Mo and a signal transparent electrode 38 1000 Å thick that is electrically connected to the signal wire 39. The signal transparent electrode 38 acts as the display electrode, and the signal wire 39 acts as the driving wire to drive the signal transparent electrode 38. On the top of this structure, there is formed an orientation film 40. Unlike in the case of the glass substrate 31 mentioned above, there is no film corresponding to the insulating film 34 formed on top of the glass substrate 37.

Figure 2:
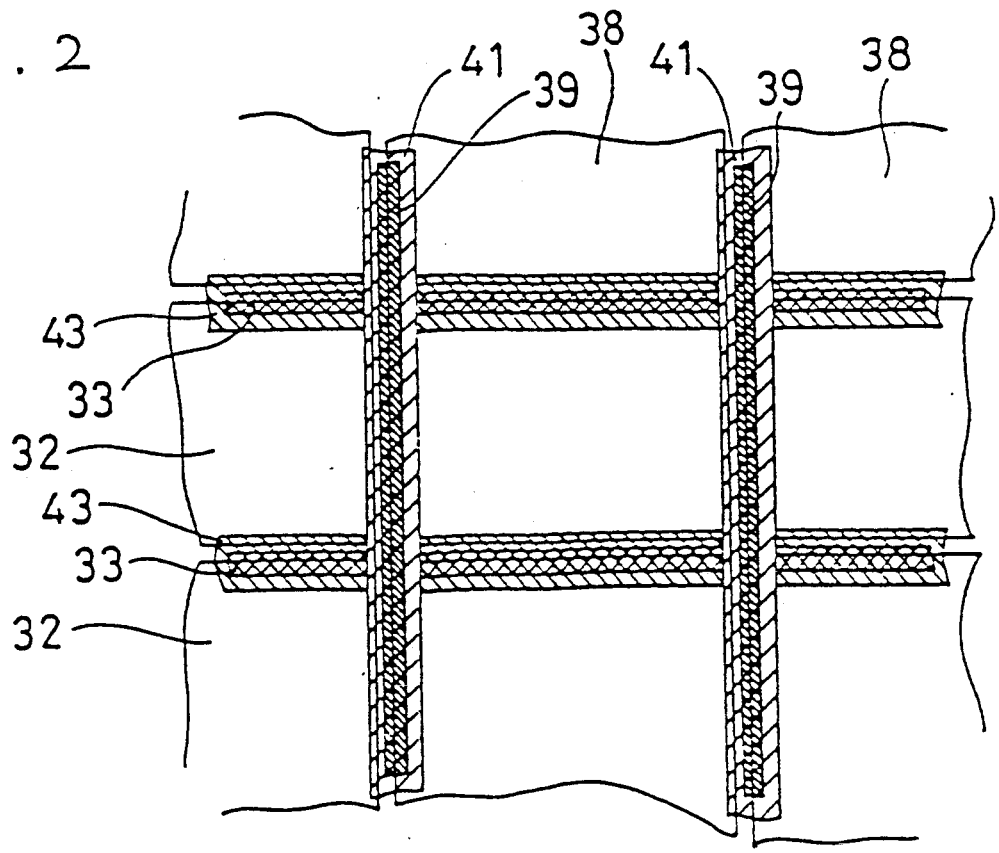
FIG. 2 is a plan view of the display apparatus of FIG. 1.

FIG. 2 is a plan view seen from the side of the glass substrate 37. Scanning wire 33 is connected with the belt-shaped scanning transparent electrode 32 along one long edge, and any region where the scanning wire 33 and the scanning transparent electrode 32 are layered together maintains the electrical connection therebetween. In the same way, signal wire 39 is formed so as to be connected along one long edge of signal transparent electrode 38, and any region where the signal wire 39 and signal transparent electrode 38 are layered together maintains the electrical connection therebetween. The region where the scanning transparent electrode 32 is not layered on the scanning wire 33 intersects the region where the signal transparent electrode 38 is not layered on the signal wire 39. The region of intersection constitutes a picture element that is part of the display. In the space between the substrates 31 and 37, there is a liquid crystal layer 36 that acts as the display medium.

Picture element defects can be located by the driving of the entire matrix substrate constructed as described above. When there is a disconnection between the scanning wire 33 and the signal wire 39, a wire defect occurs that originates at the connection defect. It can be understood from the direction of the wire defect generated whether the scanning wire 33 or the signal wire 39 has a disconnection somewhere. When there is a disconnection in the scanning wire 33, laser light can be used to irradiate both side areas of the disconnection in the scanning wire 33 and the corresponding areas of the repair wire 43 that is disposed under the scanning wire 33. The insulating film 42, affected by the laser light, breaks down, and the two areas of the scanning wire 33 and the corresponding two areas of the repair wire 43 are thereby connected electrically. In the same way, when there is a disconnection in the signal wire 39, laser light can be used to irradiate both side areas of the disconnection in the signal wire 39 and the corresponding areas of the repair wire 41 that is disposed under the signal wire 39. The insulating film 42 affected by the laser light breaks down, and the two areas of the signal wire 39 and the corresponding two areas of the repair wire 41 are connected electrically. It is possible to repair defects in this way.

EXAMPLE 2

Figure 3B:
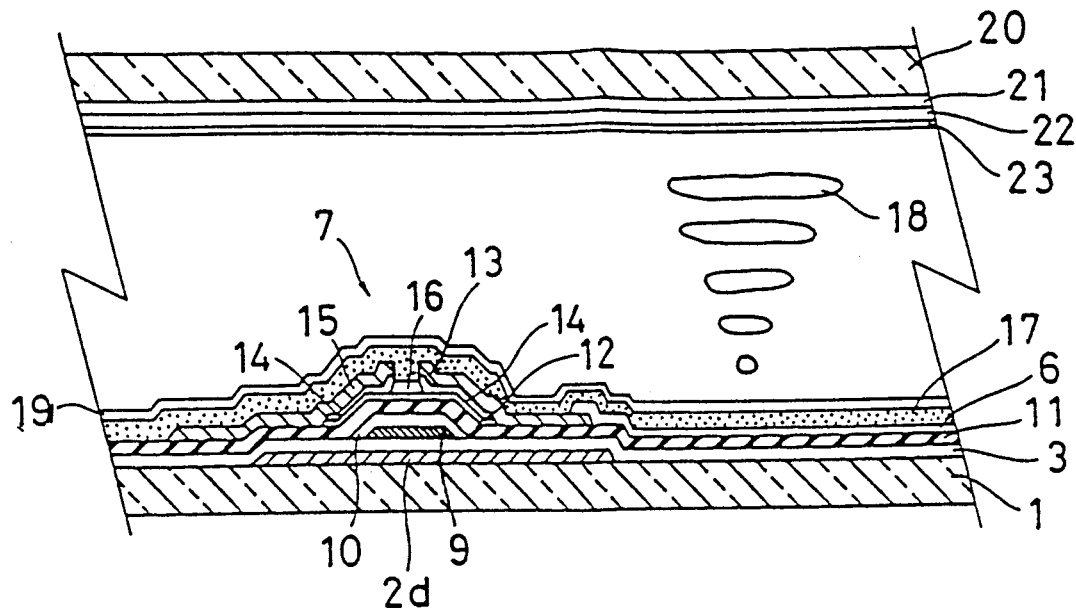
FIG. 3B is a sectional view taken along line B—B of FIG. 3A, showing the active matrix substrate used in FIG. 3A.

FIG. 3A is a plan view of an active matrix substrate that is another example of the display apparatus of this invention. FIG. 3B is a cross-sectional view taken along line B—B of FIG. 3A, showing the active matrix substrate used in the display apparatus of FIG. 3A. On glass substrate 1, there is an electrically conductive light-proof film 2 composed of single or multiple layers of Ta, Al, Mo, Ni, etc., or of resin, etc. In this example, a layer of Ta that is about 3000 Å thick was used. The conductive light-proof film 2 is shaped like a frame and is layered on the outer parts of picture element electrode 6, gate bus wire 4, and source bus wirings 5. The frame-shaped conductive light-proof film 2 is divided into four portions, 2a-2d. Over the entire surface of substrate 1 covered by the conductive light-proof film 2, a base coat film 3 about 3000 Å thick made of $Ta_2O_5$, $Al_2O_3$, $Si_3N_4$, etc., is layered. On the base coat film 3, there is formed in the shape of a lattice the gate bus wires 4 (4000 Å thick) that act as scanning wires and the source bus wires 5 (3000 Å thick) that act as the signal wires. As a rule, the gate bus wires 4 are made of a single layer or multiple layers of Ta, Al, Ti, Ni, Mo, or the like, but in this example, Ta was used. The source bus wires 5 can be formed of these same metals. In this example, Ti was used. At the point of intersection of the gate bus wires 4 and source bus wires 5, there is sandwiched between the two the base insulating film 11 mentioned below. In the rectangular area formed by the gate bus wires 4 and the source bus wires 5, there is provided a picture element electrode 6 made from a transparent conductive film (ITO), forming a picture element pattern in the form of a matrix. The picture element electrode 6 acts as a display electrode. Near a corner of the picture element electrode 6, there is placed TFT 7, which is a switching element. TFT 7 is formed on top of the gate bus wire 4, and the branch wire 8 connects the source electrode 15 of the TFT 7 and the source bus wire 5. The drain wire 25 electrically connects the drain electrode 13 of TFT 7 and the picture element electrode 6. Drain wire 25 acts as the picture element electrode driving wire. In this example, gate bus wire 4, source bus wire 5, and drain wire 25 are driving wires.

The structure near the TFT 7 will be explained with reference to FIG. 3B. On the glass substrate 1, there is formed the conductive light-proof film 2d, and there is a base coat film 3 that is formed over the entire substrate surface covered by this light-proof film 2d. On the top of the base coat film 3, there is formed a gate electrode 9 of Ta that is formed as one portion of the gate bus wires 4. On gate electrode 9, there is formed a gate insulating film 10 made of $Ta_2O_5$, obtained by the anodic oxidation of the surface of the gate electrode 9. On the gate insulating film 10, there are layered a base insulating film 11 that acts as a gate insulating film and that is made of $SiN_x$ (e.g., $Si_3N_4$), an intrinsic semiconductor layer 12 made of a-Si, a semiconductor layer protective film 16 made of $SiN_x$, and an n-type semiconductor layer 14 made of a-Si, in that order. On the n-type semiconductor layer 14, there is formed source electrode 15, which is connected to branch wires 8, and drain electrodes 13 that are connected with picture element electrodes 6. The n-type semiconductor layer 14 provides ohmic contact of the source electrodes and the drain electrodes. The semiconductor layer protective film 16 covers the intrinsic semiconductor layer 12 on its upper surface, and when the source electrode 15 and the drain electrode 13 are formed by etching, this film 16 acts as an etching stopper. The semiconductor layer protective film 16 prevents the intrinsic semiconductor layer 12 from exposure to an etchant used for the electrodes. The source electrode 15 and the drain electrode 13 are formed from Ti, Ni, Al, or the like. The picture element electrode 6 can be formed by being patterned on the base insulating film 11. The thickness for the base insulating film 11 should be about 1500-6000 Å; in this example, it was 2000-3500 Å. Almost all of the upper surfaces of the TFT 7 and the picture element electrode 6 is covered by a protective film 17 made of $SiN_x$. On the protective film 17, there is layered an orientation film 19 that controls the orientation of the liquid crystal layer 18 that is the display medium. This orientation film 19 can be made of $SiO_2$, polyimide resin, etc. The thickness of the protective film 17 should be about 2000-10000 Å; in this example, it was about 5000 Å. Moreover, for the base insulating film 11 and protective film 17, an oxide or nitride of $SiO_x$, $Ta_2O_5$, $Al_2O_3$, $TiO_2$, $Y_2O_3$, etc., instead of $SiN_x$ can be used. To prevent the formation of an electric double layer between the protective film 17 and the picture element electrode 6, there can be formed a window in the protective film 17 at the center of the picture element electrode 6.

Opposite to the glass substrate 1 that forms the picture element electrodes 6, there are formed in layers on the inside surface of glass substrate 20 a color filter layer 21, an opposing electrode 22 that faces the picture element electrode 6, and an orientation layer 23.

In the space between the pair of glass substrates 1 and 20, there is a twisted nematic liquid crystal layer 18 that is a display medium the orientation of which changes in response to voltage applied between the picture element electrodes 6 and the opposite electrode 22, which results in optical modulation.

Figure 4:
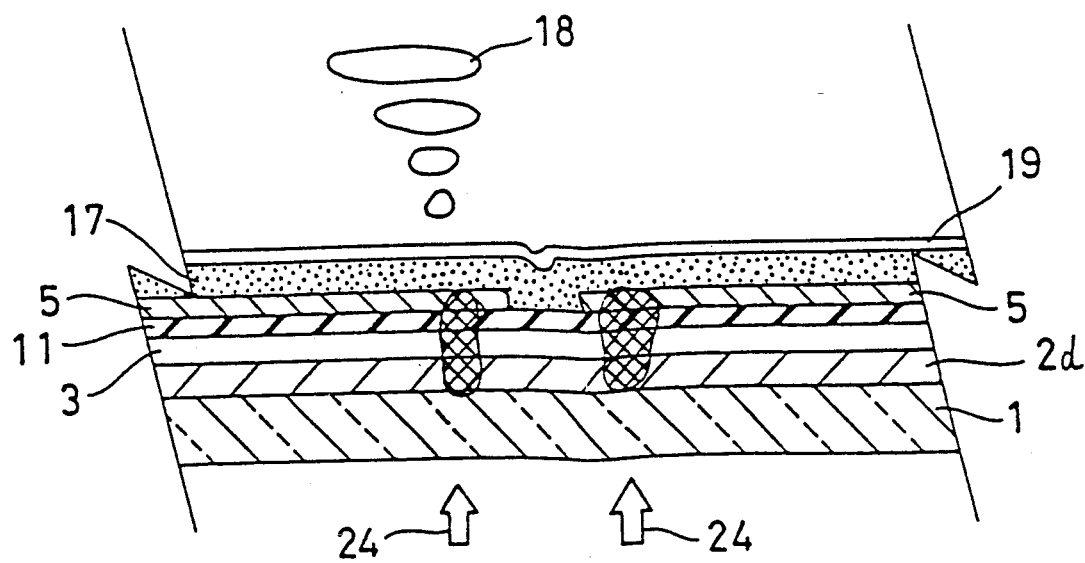
FIG. 4 is a cross-sectional view of the situation when repair is being made of a disconnection that has occurred in the source bus wiring on the substrate of FIG. 3A.

With an active matrix display apparatus of the construction described above, the driving of all of the picture element electrodes 6 through the TFTs 7 from all gate bus wires 4 and all source bus wires 5 makes it possible to identify by eye the location of picture element defects that have occurred. The picture element defects that have occurred can be repaired by the use of the conductive light-proof film 2. That is, it is possible to make use of the conductive light-proof film as repair wiring. FIG. 4 shows the situation when a disconnection in source bus wire 5 is being repaired. FIG. 4 is a cross-sectional view of the portion of the source bus wire 5 that is layered on the conductive light-proof film 2d. The view is in the direction of the extension of source bus wire 5. As shown by the arrows 24 in FIG. 4, laser light, infrared rays, an electron beam, or another form of energy is used to irradiate, through the transparent substrate 1, the superposed portions of source bus wire 5 and the conductive light-proof film 2d at both sides where the disconnection is located. In this example, YAG laser light was used. As a result of this laser irradiation, the base coat film 3 and the base insulating film 11 were broken down. The conductive light-proof film 2 and the source bus wire 5 were connected by being fused together. In this way, part of the source bus wiring 5 on one side of the location of the disconnection and part of the source bus wiring 5 at the other side of the location of the disconnection were connected electrically through the conductive light-proof film 2, so the disconnection was repaired. When there is a connection defect in the gate bus wire 4, repairs can be done in the same way. In this situation, the laser light breaks down the base coat film 3 between the gate bus wire 4 and the conductive light-proof film 2a, so that the gate bus wire 4 and the conductive light-proof film 2a are connected electrically with each other. If there is a contact defect between the picture element electrode 6 and the drain wire 25, laser light is directed onto the portion of the picture element electrode 6 that is layered on the conductive light-proof film 2a or 2d and onto the portion of conductive light-proof film 2a or 2d that is layered on the drain wire 25. In this way, the drain electrode 13 and the picture element electrode 6 come to be connected electrically through the conductive light-proof film 2a or 2d.

The repair of defects in connection and contact described above takes place between the protective film 17 and the glass substrate 1. Protective film 17 is a transparent insulator, and laser light can pass through it. For that reason, the laser light is absorbed by the driving wires or conductive light-proof film 2. These are instantly melted when heated in this way. Thus, the laser light fuses the metals and the insulating layers sandwiched between these metals, and the protective film 17 is not broken down. There is no deterioration in the insulation between the picture element electrode 6 and the liquid crystal layer 18, which is the display medium, so the picture element defect does not occur again.

Figure 5:
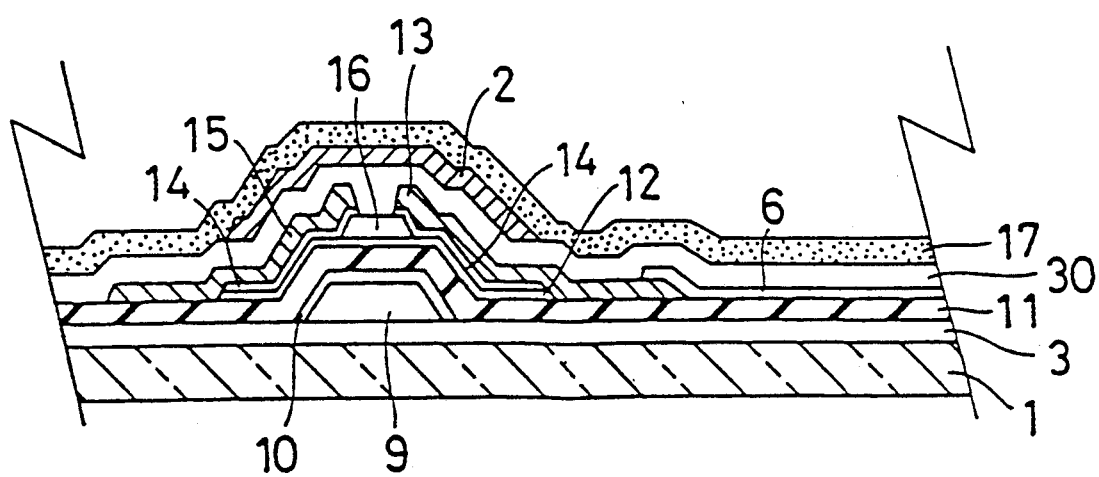
FIG. 5 is a cross-sectional view of the layered structure in the region of a TFT in still another display apparatus of this invention.
Figure 6:
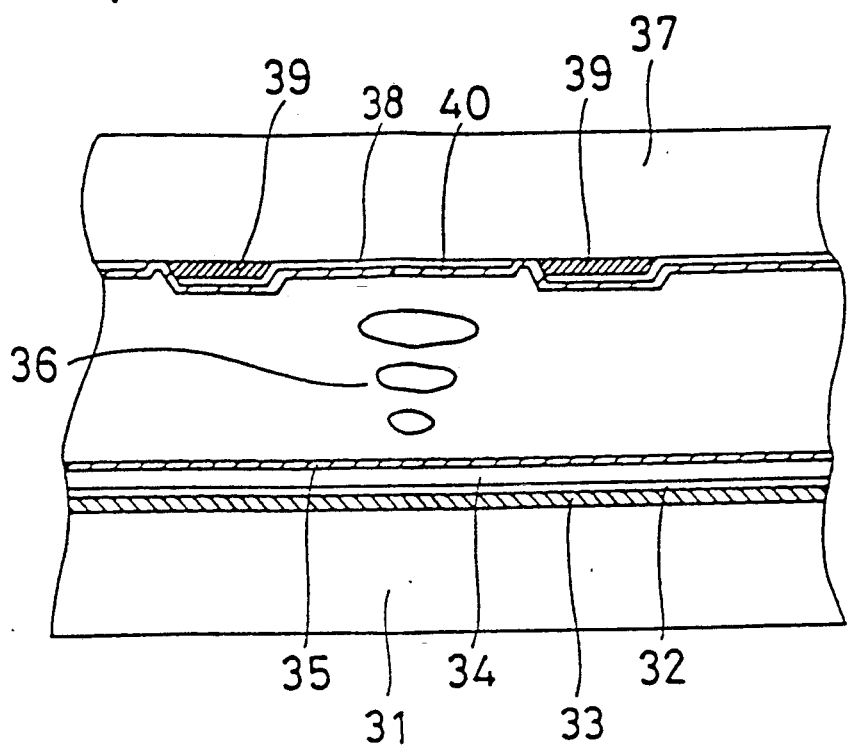
FIG. 6 is a cross-sectional view of a conventional simple matrix display apparatus.
Figure 7:
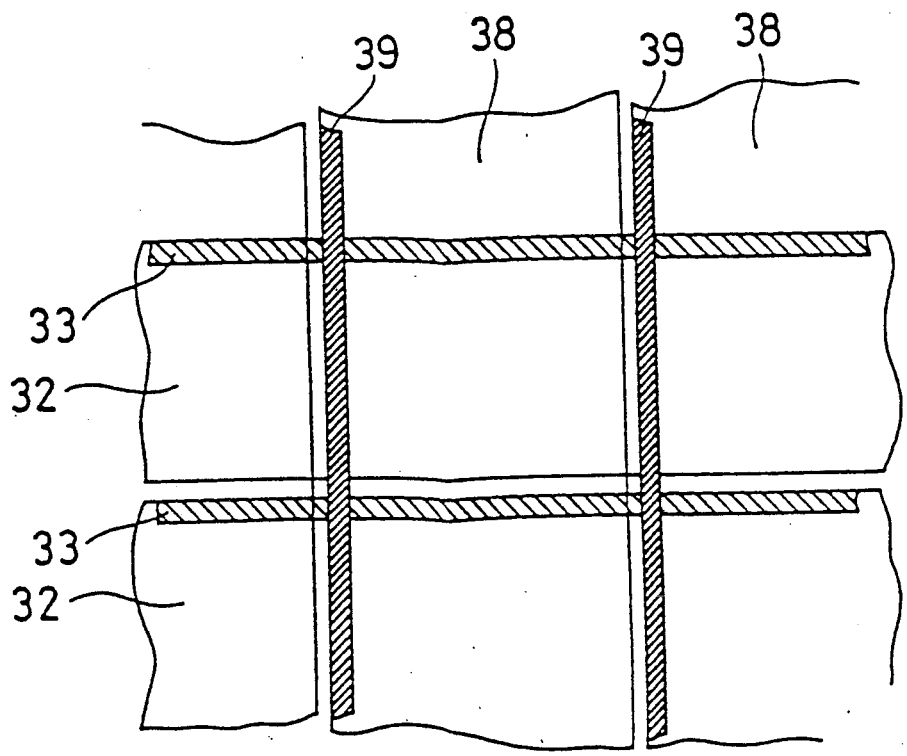
FIG. 7 is a plan view of the display apparatus of FIG. 6.
Figure 8A:
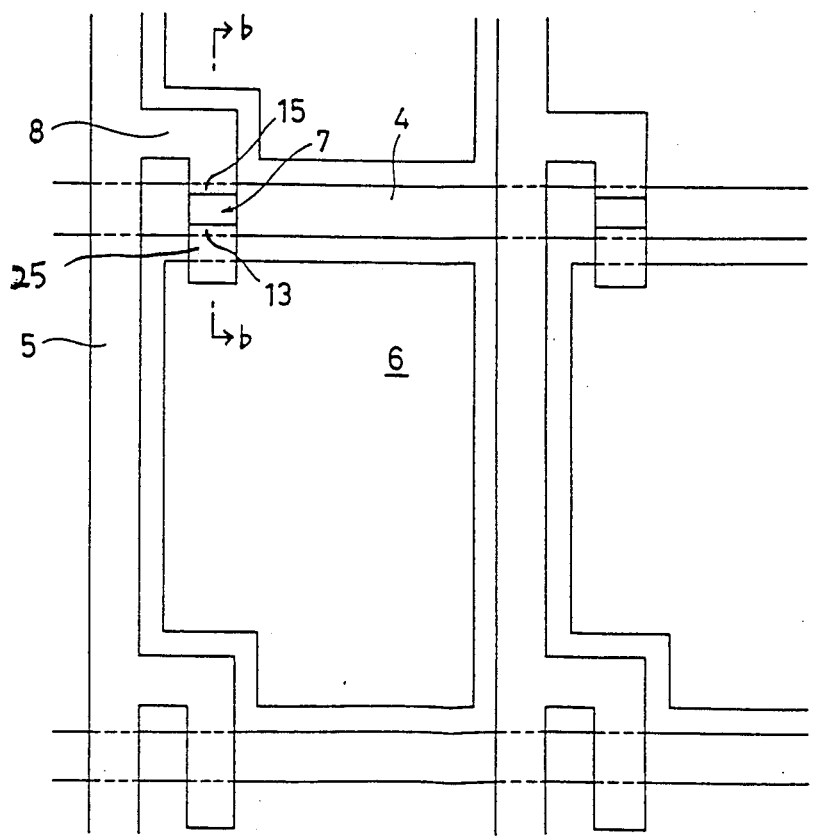
FIG. 8A is a plan view of one example of the active matrix substrate used in a conventional display apparatus.
Figure 8B:
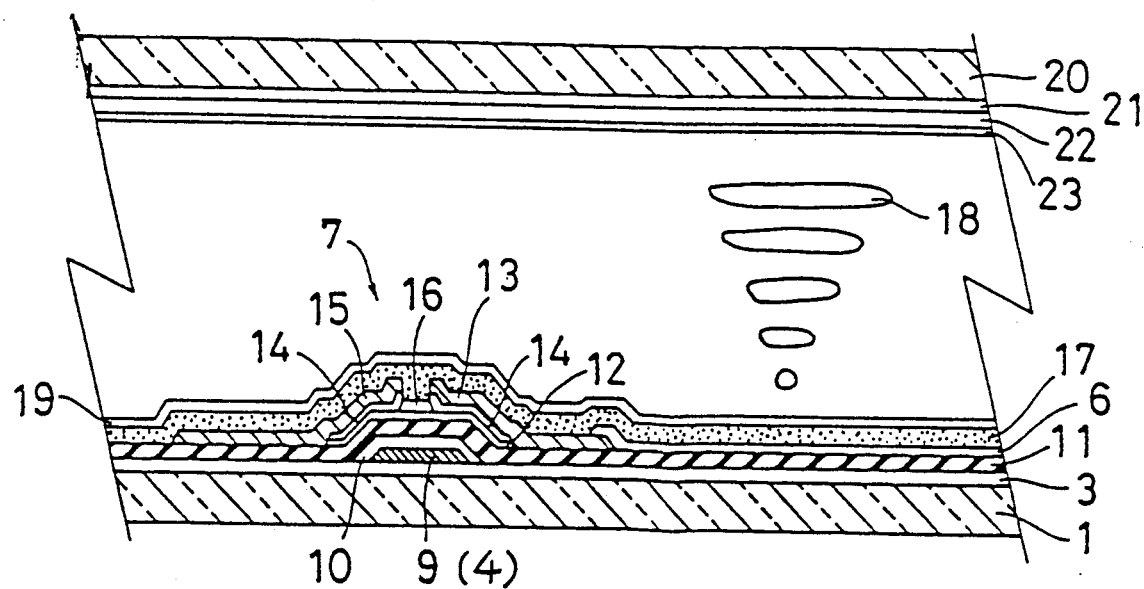
FIG. 8B is a cross-sectional view taken along line b—b of FIG. 8A, showing the substrate used in FIG. 8A.

In this example, there is a conductive light-proof film 2 for each picture element electrode 6. The film 2 is shaped like a frame surrounding the picture element electrode 6. The shape of the conductive light-proof film 2 is not limited to this shape; it may take on any shape that allows the conductive light-proof film to surround the corresponding picture element electrode in a continuous manner. The conductive light-proof film 2 may be divided into any number of parts that are not continuous with each other, if desired. On the glass substrate 1, there is no conductive light-proof film 2, but this film may be layered onto the gate bus wire 4, source bus wiring 5, TFT 7, drain electrode 13, picture element electrode 6, or the like, so as to sandwich an insulating film 30 therebetween as seen in FIG. 5. When this is provided, the base coat 3 is not always needed.

The example given here is of an active matrix liquid crystal display apparatus, but this invention is not limited thereto. This invention can be used in a display apparatus in which a switching element, such as a metal-insulator-metal (MIM) element, a diode, or a varistor is used.

This example can be used in display apparatuses that use a thin-film light-emitting layer, a distributed EL light-emitting layer, or plasma luminosity as the display medium.

The display apparatus of this invention is constructed so that any connection defect that occurs at the driving wire or any contact defect that occurs between the picture element electrode wire and the picture element electrode can be repaired, so that productivity in manufacturing is increased. This invention makes it possible to correct picture element defects when the display apparatus itself can be used to identify the location of the picture element defect. Therefore, the processes of inspection and repair are simplified, so that mass production of the display apparatus can be achieved and manufacturing costs decreased.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A matrix display apparatus comprising:
   a pair of substrates, at least one of which is translucent,
   a display medium that is placed between said pair of substrates and that modulates its optical characteristics in response to voltage that is applied,
   display electrodes that are formed on the inner surface of at least one of said pair of substrates,
   driving wires for the driving of said display electrodes, and
   repair wires for the repair of said driving wires,
   wherein said matrix display apparatus has a layered structure in which said driving wires are layered on and along said repair wires to sandwich an insulating film therebetween.

2. An active matrix display apparatus provided with a pair of substrates, at least one of which is translucent,
   a display medium that is placed between said pair of substrates and that modulates its optical characteristics in response to voltage that is applied,
   picture element electrodes arranged in matrix form on the inner surface of one of said pair of substrates;
   switching elements for driving the picture element electrodes, and
   driving wires that have scanning wires and signal wires connected to the switch elements, as well as picture element electrode driving wires that connect the switching elements and the picture element electrodes,
   wherein an electrically conductive light-proof film is layered on the outer portions of the picture element electrodes and on the driving wires to sandwich an insulating film therebetween, and divided into plural parts, and an area of the conductive light-proof film that is on the outer portions of the picture element electrodes and on the driving wires is coated with a protective film.

* * * * *